W. MENNIE.
NUT LOCK.
APPLICATION FILED SEPT. 14, 1915.

1,179,446.

Patented Apr. 18, 1916.

WITNESS
E. R. Barrett

William Mennie
INVENTOR.

BY Pagelsen and Spencer
ATTORNEYS

UNITED STATES PATENT OFFICE.

WILLIAM MENNIE, OF DETROIT, MICHIGAN, ASSIGNOR OF ONE-HALF TO CARL A. FETTIG, OF DETROIT, MICHIGAN.

NUT-LOCK.

1,179,446.  Specification of Letters Patent.  Patented Apr. 18, 1916.

Application filed September 14, 1915. Serial No. 50,683.

*To all whom it may concern:*

Be it known that I, WILLIAM MENNIE, a citizen of the Dominion of Canada, residing at Detroit, in the county of Wayne and State of Michigan, have invented a new and useful Nut-Lock, of which the following is a specification.

This invention relates to means for restraining nuts from turning back on bolts, and its object is to provide a simple, cheap and efficient nut-lock that can be applied to any nut.

This invention consists in a coil spring adapted to fit in the threads of a bolt provided with a nut, one end of the spring being attached to the nut, the direction of the winding being such as to follow the threads of the bolt, and the diameter of the coil insuring a certain amount of gripping of the bolt by the spring.

Figure 1:
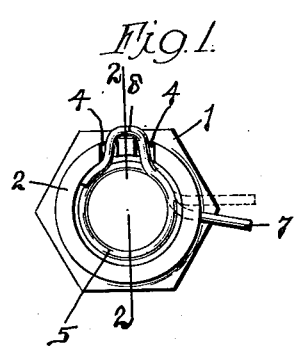
Figure 2:
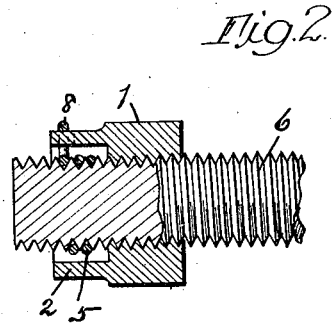
Figure 3:
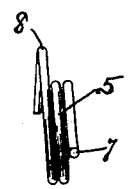
Figure 4:
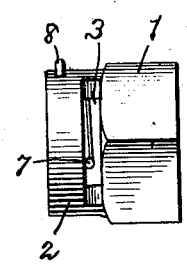
Figure 5:
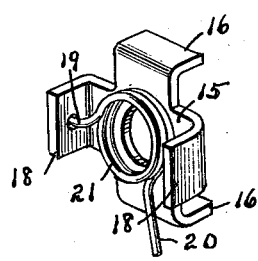
Figure 6:
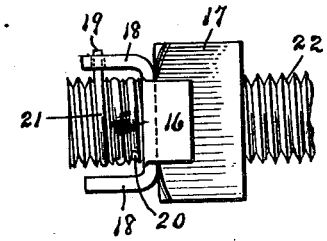
Figure 7:

In the accompanying drawing, Figure 1 is an end view of a nut equipped with this improved nut-lock. Fig. 2 is a section on the line 2—2 of Fig. 1. Fig. 3 is an elevation of the spring. Fig. 4 is a side view of the nut shown in Fig. 1. Fig. 5 is a perspective view of a lock adapted to be attached to a square nut. Fig. 6 is a side view of a nut with the lock connected to it. Fig. 7 is a view of a nut with a modified form of lock mounted thereon.

Similar reference characters refer to like parts throughout the several views.

This nut-lock is operative for the reason that when a piece of wire is so tightly coiled around a rod that the rod cannot be turned within the coil without friction, turning the rod when one end of the wire is held stationary will uncoil the wire or tighten the coil, depending upon the direction the coil is wound and the rod is turned. When the turning of the rod tightens the coil, a point is soon reached when the coil so tightly grips the rod that the two are rigidly united. This is equally true with a threaded rod screwed into a coil whose winding has substantially the pitch of the thread. If now one end of the coil is secured to a nut, the turning of the bolt in one direction will slack up the coil and permit the bolt to turn freely in the nut while turning the bolt in the opposite direction will lock the nut to the bolt.

The several embodiments of the invention shown in the drawing differ in the attachment of one end of the spring to the nut. In each, the spring is coiled in the direction of the thread so that the bolt may be screwed through both nut and spring. In the construction in Figs. 1 to 4, the nut 1 has a cylindrical extension 2 provided with a transverse slot 3 near the body of the nut and two short notches 4 in its edge. The spring 5 is of round spring wire, preferably a little less in diameter than the pitch of the thread of the bolt 6 and of such internal diameter that it will slightly grip the bolt when screwed into it. This coil has preferably about two turns, although a few more turns will insure a better grip. One end 7 of the wire extends out through the slot 3 in the nut, while the other end 8 is in the form of a loop that may lie in the notches 4 to secure that end of the spring to the nut.

When the parts are in the position shown in Fig. 2, the bolt may be freely turned to the right or screwed into the nut, for doing so will uncoil or open the turns of the spring. But any attempt to unscrew the bolt causes the spring to tighten its coils and immediately locks the nut to the bolt. It is only by shearing the spring or by unwinding it that the nut is released, unwinding being performed by pushing the extension 7 of the spring in the direction the nut is to be turned, as indicated by dotted lines in Fig. 1. This uncoils the spring and permits free turning movement between the bolt and nut.

A cheaper construction is shown in Fig. 7 where one end 9 of the coil 10 extends into a small hole in the nut 12, being held in position by a wedge 11. The other end 13 of the spring can be swung back to unwind the coil to release the bolt. It is therefore apparent that any connection may be employed between the spring and the nut so long as one end of the spring is relatively immovable. The end of the coil which is in advance when the nut-lock is being turned onto the bolt must be loose and the other end must be attached to the nut or other object that is to be locked to the bolt.

In this description, the parts have been referred to as a bolt, and a nut thereon secured by a nut-lock from turning on the bolt. But it must be understood that these statements are merely relative and that the device shown in the drawing will operate equally well to prevent the bolt from turning in a nut or in any other internally threaded stationary part to which the locking-spring may be attached, and furthermore, that the term bolt should be interpreted to include studs, screws, headed bolts and externally threaded tubes.

While a plurality of turns or coils are desirable for small bolts and light wire, one complete turn may often be found sufficient, especially for bolts of one inch and upward in diameter.

Where it is undesirable to connect the spring directly to the nut, a spring carrier or clip may be so mounted on the nut that one end of the spring will turn with the nut. The spring carrier may be in the form of a sheet metal stamping having a body 15, lips 16 that may be turned down to grip the sides of the nut 17, and lips 18 that project upwardly, one being perforated to receive the outer end 19 of the spring 21, the inner end 20 of which will project so that it can be pressed back to free the bolt 22. This clip will be positioned on the nut before the nut is screwed onto the bolt. The efficiency depends upon the strength of the wire to resist shearing and the resiliency that insures a grip.

I claim:—

1. A nut-lock consisting of a spring wire extending a plurality of turns around the threaded portion of a bolt adjacent a nut whose movement in the direction of the lock is to be restrained, and means to prevent relative rotation between the nut and one end of the spring, the other end of the spring being free and consisting of a sheet metal clip having a pair of arms engaging the nut and a third arm extending from the nut and perforated to receive one end of said spring.

2. A nut lock adapted to be mounted on a bolt to prevent the revolution of an apertured and threaded object in one direction relative to the bolt screwed into it, consisting of a coil of wire lying in the threads of the bolt, a sheet metal clip connected to the threaded object and to the end of said wire farthest from the object to cause said end to turn with the threaded object.

In testimony whereof I sign this specification.

WILLIAM MENNIE.